Dec. 1, 1942.  D. I. JOURDAN  2,303,743
PIPE JOINT FASTENER
Filed March 25, 1941
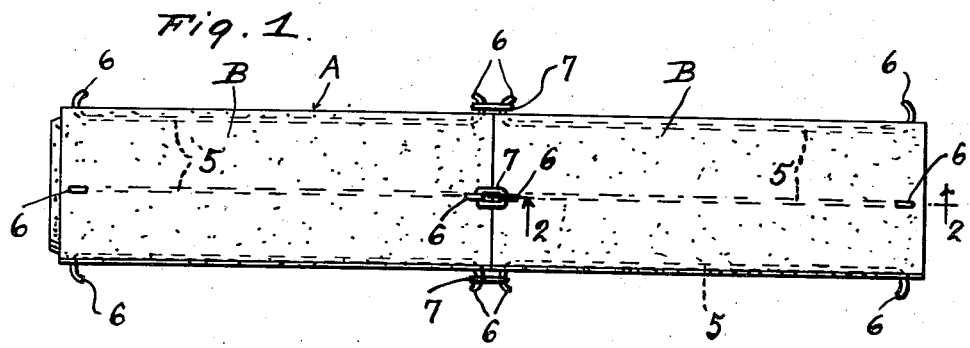
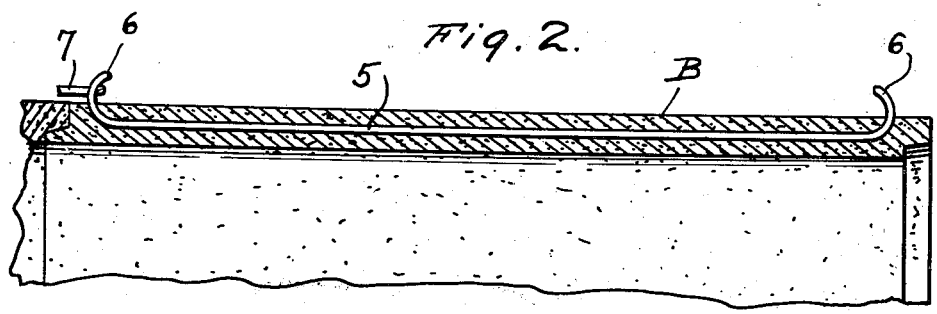
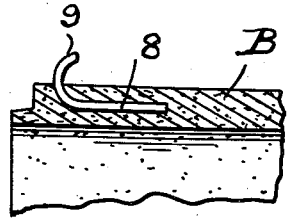
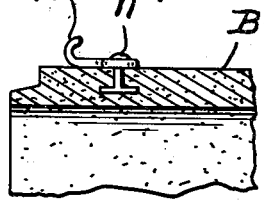
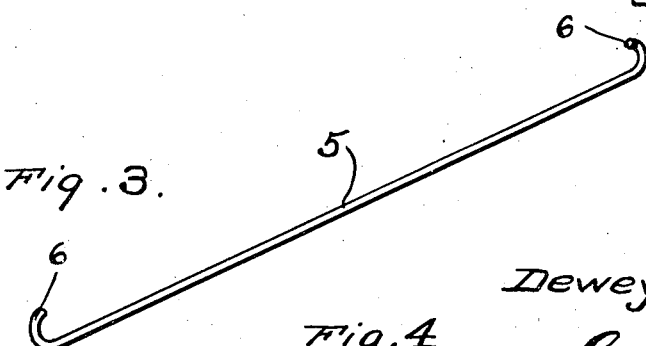
Inventor
Dewey I. Jourdan
By L. B. James
Attorney Patented Dec. 1, 1942

2,303,743

UNITED STATES PATENT OFFICE 2,303,743

PIPE JOINT FASTENER

Dewey I. Jourdan, Ventura, Calif.

Application March 25, 1941, Serial No. 385,189

1 Claim. (Cl. 285—112)

This invention relates to pipe joints and more particularly fasteners therefor.

The primary object of this invention resides in the provision of means for fastening pipe sections together so as to permit a certain degree of flexibility to prevail between the same.

Another object of this invention resides in the provision of means carried by pipe sections adjacent their ends adapted to be connected together by associated means in such manner that a certain degree of flexibility will prevail between the connected pipe sections.

A further object of this invention resides in the particular construction of the pipe carrying means.

A still further object of this invention resides in the particular construction of the connecting means associated with the pipe carrying means.

Aside from the aforesaid objects this invention resides in the new and advantageous method of assembling the pipe connecting means to flexibly secure the pipe sections together.

With these and other objects in view this invention resides in certain novel features of construction and arrangement of elements to be hereinafter more particularly set forth in the specification, illustrated in the accompanying drawing and pointed out in the appended claim and, while this disclosure depicts my present conception of the invention, the right is reserved to resort to such changes in construction and arrangement of elements as come within the scope of the claim.

In the accompanying drawing forming a part of this application:

Fig. 1 is a side view of two sections of concrete pipe connected together with the fastening means forming the subject matter of this application.

Fig. 2 is an enlarged longitudinal section of a portion of the pipe taken approximately on line 2—2 of Fig. 1.

Fig. 3 is a detail perspective view of the rod and hooks.

Fig. 4 is a similar view of the ring.

Fig. 5 is an enlarged longitudinal sectional view of a portion of the pipe showing a modified form of rod and hook.

Fig. 6 is a similar view of the pipe showing another form of hook.

In the present illustration of this invention the letter A designates a portion of an underground drainage conduit consisting of abutting sections B embedded in each of which is a plurality of elongated steel rods 5 having their opposite extremities protruding from the outer peripheries of the pipes and bent to form opposed hooks 6.

Subsequent to assembling the pipe sections into a conduit with those hooks adjacent the joint disposed in longitudinal alignment, steel rings 7 are sprung over each pair of adjacent hooks thus fastening the sections together so as to permit a certain degree of flexibility between the sections.

In that form of the invention shown by Fig. 5 of the drawing short rods 8 are embedded in the pipes with their free ends protruding from the outer surface of the pipe and bent to form hooks 9.

In Fig. 6 of the drawing a hook 10 is shown as secured to the pipe by a stud 11 and, while this is but one of the numerous methods of connecting the hooks to the pipe sections, it is within the purview of this invention to secure the hooks to the pipe in any well known manner such as by welding where metal pipes are used or bolting, riveting, etc.

With this invention fully described it is manifest that a pipe joint fastener is provided which will securely retain sections of pipe flexibly together and, through the particular construction of the hooks and rings, connection of the pipe sections can be readily made with little labor in the minimum length of time.

Having thus described my invention what I claim and desire to protect by Letters Patent is:

The combination with abutting pipe sections of piping systems, longitudinally extending and aligned rods embedded in the pipe sections with their opposite ends extending from the outer peripheries of the pipe sections and bent in opposite directions, and elongated rings connecting opposed bent ends of the rods.

DEWEY I. JOURDAN.